United States Patent [19]

Winkler et al.

[11] Patent Number: 5,103,792
[45] Date of Patent: Apr. 14, 1992

[54] PROCESSOR BASED FUEL INJECTION CONTROL SYSTEM

[75] Inventors: Robert R. Winkler, Vernon; William W. Kelly, Granby, both of Conn.

[73] Assignee: Stanadyne Automotive Corp., Windsor, Conn.

[21] Appl. No.: 598,035

[22] Filed: Oct. 16, 1990

[51] Int. Cl.⁵ .................................... F02M 37/00
[52] U.S. Cl. ............................. 123/506; 123/494
[58] Field of Search ............. 123/450, 506, 500, 501, 123/494; 73/119 A

[56] References Cited

U.S. PATENT DOCUMENTS

| | | | |
|---|---|---|---|
| 4,617,902 | 10/1986 | Hirano | 123/501 |
| 4,630,588 | 12/1986 | Sagawa | 123/506 |
| 4,643,155 | 2/1987 | O'Neill | 123/500 |
| 4,706,635 | 11/1987 | Draper | 123/506 |
| 4,757,795 | 7/1988 | Kelly | 123/506 |
| 4,788,960 | 10/1988 | Oshizawa | 123/494 |
| 4,800,861 | 1/1989 | Oshizawa | 123/506 |
| 4,971,012 | 11/1990 | Brunner | 123/506 |

FOREIGN PATENT DOCUMENTS

| | | | |
|---|---|---|---|
| 0187537 | 11/1983 | Japan | 123/506 |
| 0249653 | 10/1985 | Japan | 123/506 |

Primary Examiner—Carl Stuart Miller
Attorney, Agent, or Firm—Chilton, Alix & Van Kirk

[57] ABSTRACT

An electrical control unit having a microprocessor and a network of counters for governing the electrical operation of a fuel control valve of a fuel injection pump. Four subtraction counters are preset by the processor; one is used as a time counter indexed by time pulses and three are used as pump angle counters indexed by pump clock pulses generated for each predetermined increment of pump rotation. Two of the pump angle counters are employed to precisely open and close the valve for regulating the fuel injection timing and quantity—the total quantity in a normal mode of operation and a pilot quantity in a pilot injection mode. In the pilot mode, the third pump angle counter regulates the main injection quantity and the time counter regulates the time delay between the pilot and main injections. Two addition counters are indexed by the pump clock pulses to determine a count of the pump angle between pump and engine reference points (ERA count) and a count of the pump angle of the valve closure response time (VRA count). The ERA and VRA counts are used by the processor in determining the preset counts for the subtraction counters. Two fixed angle counters are operated by engine clock pulses generated for each predetermined increment of engine rotation, to start and stop a speed counter indexed by the time pulses to determine the instantaneous engine speed between power strokes for fuel balancing at engine idle.

22 Claims, 9 Drawing Sheets

PROCESSOR BASED FUEL INJECTION CONTROL SYSTEM

The present invention relates generally to internal combustion engine fuel injection systems of the type having a reciprocating charge pump for periodically delivering charges of liquid fuel under high pressure for fuel injection and electrical valve means electrically operable for regulating the fuel injection timing and/or quantity and relates more particularly to processor based control systems for electrically operating the electrical valve means.

A primary aim of the present invention is to provide in such a processor based control system, new and improved method and apparatus for electrically operating the electrical valve means for precisely regulating the fuel injection timing and/or quantity. The new and improved method and apparatus may be used in various kinds of fuel injection systems of the type described. For example, the method and apparatus may be used in fuel injection systems which employ either a separate unit injector at each engine cylinder or a single fuel injection pump for all of the engine cylinders and which employ either a pump-spill or a fill-spill mode of regulation.

Another aim of the present invention is to provide in such a processor based control system, new and improved method and apparatus for electrically regulating the opening and closing of the electrical valve means by precisely measuring and governing certain phases of each charge pump cycle. In accordance with this aim of the present invention, each such phase is measured and governed by precisely measuring and governing a corresponding angle of rotation of a charge pump drive rotor and electrically opening or closing the electrical valve means after the measured angle reaches a preset value predetermined to produce the desired control.

Another aim of the present invention is to provide in such a processor based control system, new and improved method and apparatus for full authority electrical regulation of the electrical valve means in accordance with any desired engine parameters such as engine speed, engine coolant temperature, fuel temperature, engine altitude or intake manifold pressure, air temperature and load demand.

Another aim of the present invention is to provide in such a processor based control system, new and improved method and apparatus for electrical regulation of the electrical valve means in a failsafe mode of operation.

Another aim of the present invention is to provide in such a processor based control system, new and improved method and apparatus for precise electrical regulation of the electrical valve means to provide two stage fuel injection during certain low speed engine operation.

Another aim of the present invention is to provide in such a processor based control system for a multiple cylinder engine, new and improved method and apparatus for precise electrical regulation of the electrical valve means to adaptively balance the power strokes of the engine during certain low speed engine operation.

A further aim of the present invention is to provide in such a processor based control system, new and improved method and apparatus for regulating the electrical valve means in a manner which is reliable in operation and useful in the kinds of fuel injection systems referred to above.

Other objects will be in part obvious and in part pointed out more in detail hereinafter.

A better understanding of the invention will b obtained from the following detailed description and accompanying drawings of preferred embodiments of the invention.

BRIEF DESCRIPTION OF THE DRAWINGS

In the drawings:

FIG. 1 is an illustration which is partly diagrammatic of a fuel injection system incorporating an embodiment of a processor based control system of the present invention showing the system partly diagrammatically and including a partial longitudinal section view, partly broken away and partly in section, of a fuel injection pump of the system;

DESCRIPTION OF PREFERRED EMBODIMENTS

In the drawings, the same numerals are used to identify the same or like functioning parts or components. The processor based control system of the present invention may be used with different kinds of diesel engine fuel injection systems of the type having a reciprocating charge pump for periodically delivering charges of liquid fuel under high pressure for fuel injection and electrical valve means electrically operable for regulating the fuel injection timing and/or quantity. Included are fuel injection systems, sometimes referred to as pump-spill systems, wherein the charge pump is completely filled during the intake stroke and the electrical valve means is closed between the intake and pumping strokes and then reopened before the completion of the pumping stroke. Also, the processor based control system has notable utility with fuel injection systems, sometimes referred to as fill-spill systems, of the kind described in U.S. Pat. No. 4,884,549, dated Dec. 5, 1989 and entitled "Method And Apparatus For Regulating Fuel Injection Timing And Quantity". Accordingly, the processor based control system is hereafter described with reference to a fill-spill fuel injection system like that described in U.S. Pat. No. 4,884,549 and U.S. Pat. No. 4,884,549 is incorporated herein by reference Referring to FIG. 1, an embodiment 6 of the processor based control system is shown employed with a diesel engine fuel injection system 8 of the kind having a single fuel injection pump 9 for periodically delivering liquid fuel at high pressure to each fuel injector 15 of an associated four cylinder engine 16. The fuel injection pump 9 has a reciprocating, positive displacement charge pump 10. Except as otherwise described herein, the charge pump 10 may be generally like the charge pump disclosed in U.S. Pat. No. 4,476,837, dated Oct. 16, 1984 and entitled "Method And System For Fuel Injection Timing". Accordingly, U.S. Pat. No. 4,476,837 is incorporated herein by reference.

The charge pump 10 has a rotor 104 which forms part of a pump drive shaft 102. The drive shaft 102 is driven by the engine 16 at one-half engine speed. A pair of pumping plungers 12 of the charge pump 10 are reciprocable in a diametral bore 41 of the charge pump rotor 104 for pumping fuel from a pumping chamber 42 formed between the pumping plungers 12. A cam ring 14 encircling the rotor 104 has an internal cam 17 engageable by plunger actuating rollers 106 for periodically camming the plungers 12 inwardly together during rotation of the rotor 104. The cam ring 14 is either fixed to provide fixed charge pump stroke timing or is angularly adjustable to adjust the charge pump stroke timing, for example by an advance piston 107 controlled by a stepper motor 108 as disclosed in U.S. Pat. No. 4,476,837.

The internal cam 17 of the cam ring 14 has a plurality of equiangularly spaced, identical cam lobes 22, one for each engine cylinder. Each cam lobe 22 has an intake ramp 23 and a pumping ramp 24. The slope of the active segment of the pumping ramp 24 in part determines the time/pressure profile of the fuel injection event. The slope of the pumping ramp 24 can be made constant along the length of the ramp 24 (i.e., to produce a constant plunger velocity at each pump speed) as represented by the straight pumping slope 25 shown in FIGS. 2 and 3. In that event, the time/pressure profile of the fuel injection event is not dependent on the active ramp segment. In the alternative (not shown), the slope can be varied along the length of the ramp 24 so that the time/pressure profile is dependent on the active segment. Adjustment of the charge pump stroke timing (i.e., angular adjustment of the cam ring 14) permits the length of the pumping ramp 24 to be reduced and the active segment of the pumping ramp 24 to be selected.

Figure 2:
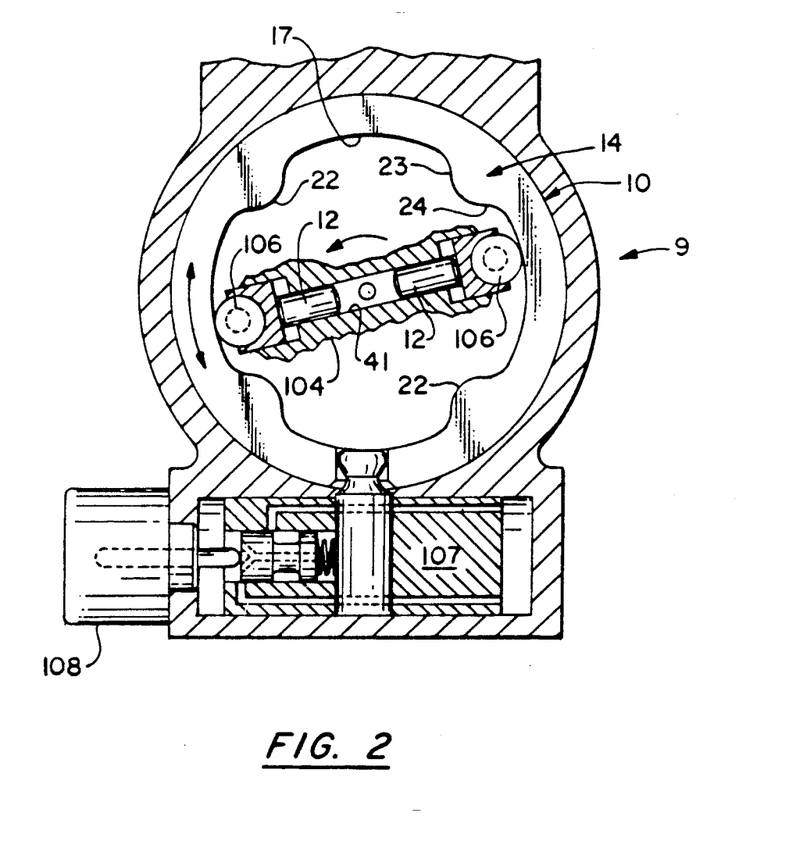
FIG. 2 is a transverse section view, partly broken away and partly in section, of the fuel injection pump.
Figure 3:
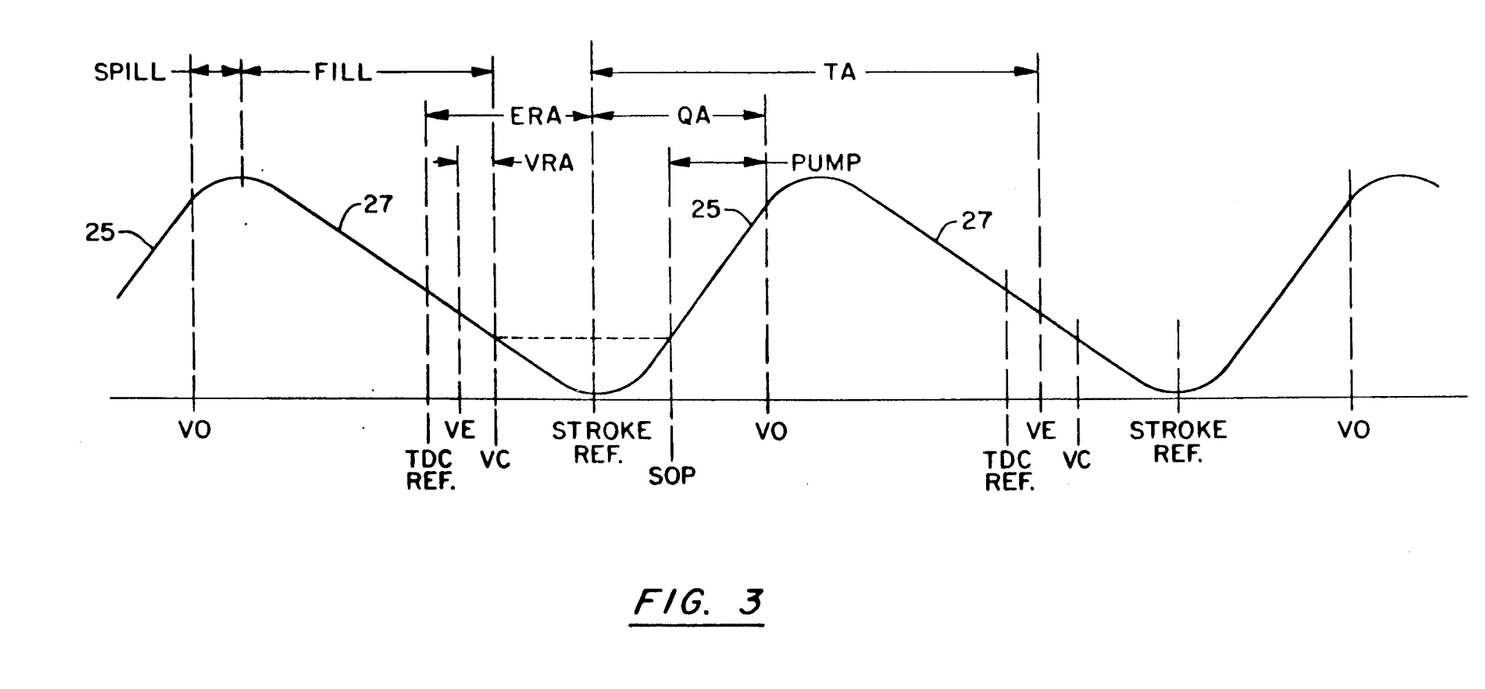
FIG. 3 is a graph representation showing a stroke profile of a charge pump of the fuel injection system, and identifying certain phases and points of representative cycles of the fuel injection system.
Figure 4:
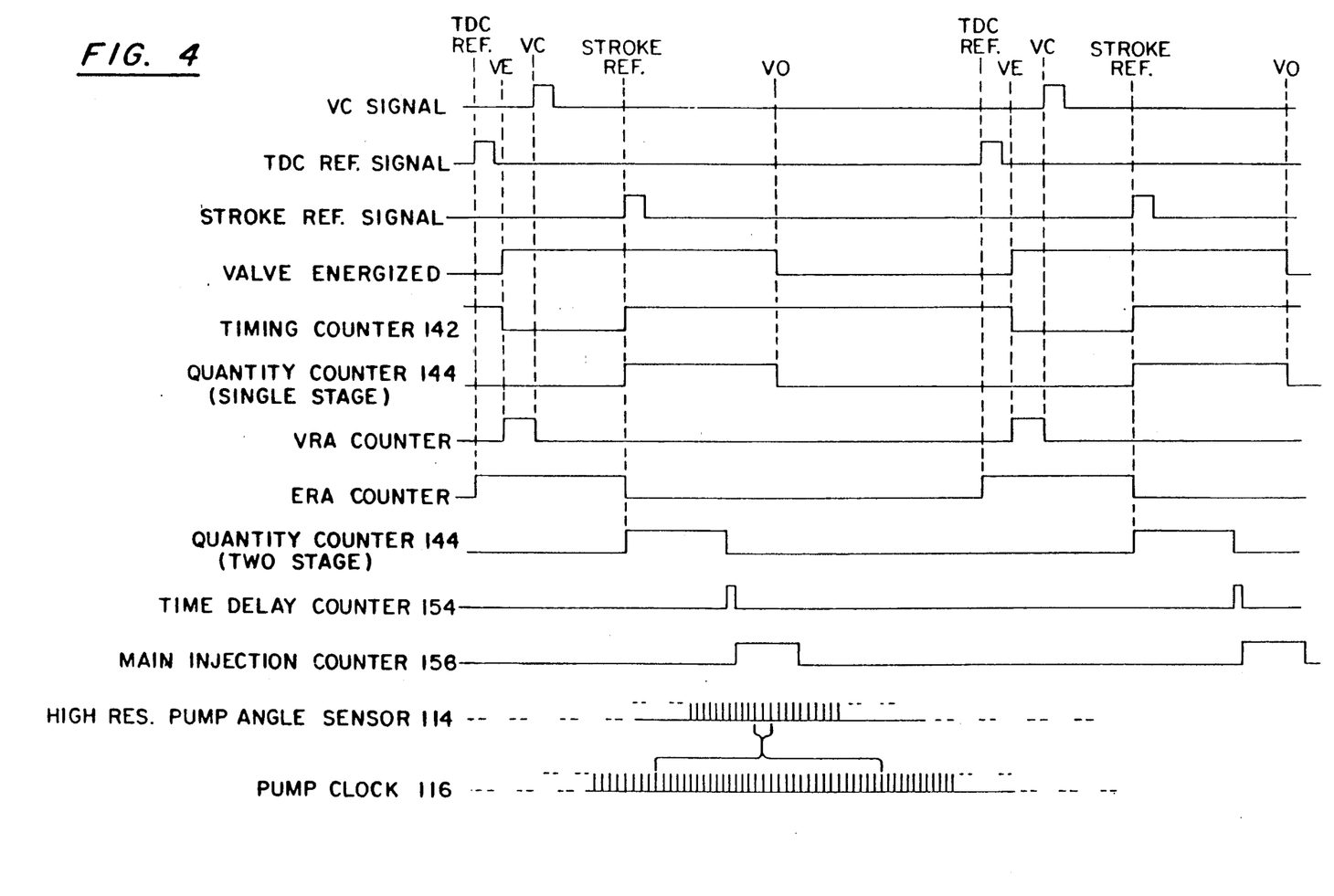
FIG. 4 is a timing chart showing the relationship of certain operations of the processor based control system and certain timing signals generated by the system.

As shown in FIGS. 2 and 3, the intake ramp 23 is contoured to provide an intake slope 27 substantially less than the relatively steep pumping slope 25.

A bidirectional flow, electrical control valve 30 (either alone or in conjunction with an auxiliary inlet valve as disclosed in U.S. Pat. No. 4,884,549) supplies fuel to the charge pump 10 during an initial charging phase of each intake stroke. The control valve 30 is closed during the intake stroke by energizing a valve solenoid 40. The valve 30 remains closed during the remainder of the intake stroke and during a succeeding initial phase of the pumping stroke. During that initial phase of the pumping stroke, the vapor or cavitation space in the pumping chamber 42 and fuel delivery bore 43 in the rotor 104 is eliminated and then a charge of fuel is delivered at high pressure for fuel injection. The valve solenoid 40 is deenergized before the end of the pumping stroke to open the control valve 30 and spill the excess quantity of fuel and thereby terminate fuel injection. Fuel is exhausted or spilled from the charge pump 10 via the open valve 30 during the remainder of the pumping stroke. Thus, the quantity of fuel supplied to the charge pump 10 during the initial charging phase of the intake stroke is always greater than the quantity of fuel delivered under pressure for fuel injection.

The valve 30 has a coil compression spring 48 which, in combination with a slight hydraulic opening force on the valve member 50 when closed, rapidly opens the valve 30 and provides the desired spill termination response when the valve solenoid 40 is deenergized. The control valve 30 has a quick but slower closure response time due to the slower response of the solenoid 40 when energized.

An electrical control unit (ECU) 84 determines and controls the solenoid energization and deenergization timing for each fuel injection cycle (i.e., engine/charge pump cycle) and, where the cam ring 14 is adjustable, determines and controls the angular position of the cam ring 14. Each such determination is based on certain fixed engine and pump data and certain current engine and pump operating data.

The fixed engine and pump data is stored in the form of tables and algorithms in an EPROM of an ECU memory 82. The fixed data includes charge pump stroke profile data and injection system installation and calibration data. The fixed data enables the ECU 84 to determine from certain current engine operating data, (a) the desired timing for energizing the valve solenoid 40 to achieve the desired fuel injection timing, (b) the desired charge pump stroke reference (Stroke Ref.) timing, where adjustable, to use the desired active segment of the pumping ramp 24 and (c) the desired valve opening (VO) timing to inject the desired quantity of fuel.

The current engine and pump operating data includes the actual Stroke Ref. timing and the engine reference angle (ERA) offset between the engine top-dead-center reference (TDC Ref.) point and the Stroke Ref. point. The current operating data also includes the actual timing of valve energization (VE) and the valve response angle (VRA) between valve energization (VE) and valve closure (VC) (i.e., when the valve 30 reaches its fully closed position).

Determination of VC timing from the timing of valve energization (VE) is acceptable in some configurations where a small variation in VRA does not cause a significant variation in the metered inlet quantity of fuel. Preferably however, a superimposed VC voltage signal, induced by a change in the velocity of the solenoid armature 54 and generated when the valve 30 reaches its fully closed position, is employed to determine actual VC timing.

VC timing and start-of-pumping (SOP) timing occur essentially at the same level on the intake and pumping ramps 23, 24 of the cam lobes 22 (where, as preferred, a stroke-time inlet metering process is employed as described in U.S. Pat. No. 4,884,549). Actual fuel injection timing (i.e., start of fuel injection) occurs slightly later than SOP timing primarily due to the compression of fuel at the high fuel injection pressure. Thus, both SOP and actual fuel injection timing are a function of (a) Stroke Ref. timing and (b) VC timing (or quantity of fuel metered to the charge pump 10 during the pump intake stroke). For any given Stroke Ref. timing, or if the charge pump stroke timing is fixed, SOP timing is precisely regulated solely by precisely regulating VC timing.

A charge pump timing sensor 110 is provided for generating a Stroke Ref. timing signal. As hereafter described in more detail, the Stroke Ref. timing signal is used as a starting point for measuring and governing (a) a valve energization or timing angle TA which, in combination with the valve response angle VRA and the Stroke Ref. timing, determines the actual fuel injection timing and (b) a valve deenergization or quantity angle QA which determines the actual quantity of fuel injected. (As hereafter described, the quantity angle QA establishes the total quantity of fuel injected, except that when pilot injection is provided, the quantity angle QA establishes the quantity of a pilot charge of fuel.)

A suitable SOP sensor (not shown) may be provided as shown in U.S. Pat. No. 4,884,549 for generating a closed loop feedback signal when the fuel pressure reaches a predetermined level of for example 1000 psi. In the alternative, a start of injection (SOI) sensor, (e.g., needle valve lift sensor provided in one of the fuel injectors 15) may be provided for generating a closed loop feedback signal of the actual commencement of fuel injection. The SOP or SOI sensor signal can be used by the ECU 84 to verify the Stroke Ref. timing and/or VC timing. That is so, because, as described in U.S. Pat. No. 4,884,549, there is only one possible cam position (i.e., Stroke Ref. timing) for any given VC timing and succeeding SOP or SOI timing. Likewise, there is only one possible VC timing for any given Stroke Ref. timing and SOP or SOI timing.

A high resolution pump angle sensor 114 is provided for measuring the rotation of the pump rotor 104. In the disclosed system, the angle sensor 114 is an infrared sensor which generates an output train of 512 equiangularly spaced pulses during each revolution of the pump rotor 104 (i.e., every 0.703 degrees). For greater accuracy, each angular increment between sensor output pulses is electronically divided into many equal time increments (representing equal angular increments) by a suitable phase-lock-loop (PLL) multiplier 116 which functions as a high frequency pump clock. In the disclosed system, the pump clock 116 provides sixteen (16) clock pulses for each sensor pulse (i.e., a clock pulse every 0.044 degrees). The clock frequency is set, when each sensor pulse is generated, at a fixed multiple (sixteen in the disclosed system) of the instantaneous or incremental sensor frequency determined by the time interval between the last two sensor pulses. Thus, at an incremental pump rotor speed of 2000 RPM, the incremental sensor frequency is 17.066 kHz and the pump clock frequency is 273.056 kHz (i.e., 16 × 17.066 kHz). The PLL multiplier 116 automatically adjusts the clock frequency to maintain the 16 to 1 relationship when the incremental speed changes. Where greater accuracy is desired, the multiplier is increased (e.g., doubled) and/or the sensor pulse train is doubled (e.g., by using both the leading and trailing edges of each signal).

A combined sensor (not shown) may be used in place of the two pump sensors 110, 114 to provide both pump sensor outputs by employing a pattern change (e.g., missing pulse trigging element) immediately in advance of the rotor timing signal, for example as disclosed in U.S. Pat. No. 4,884,549. Where, as in the disclosed system, the cam ring 14 is adjustable, the detectors 111, 115 of the two pump sensors 110, 114 (or the detector of a combined sensor) are mounted on the cam ring 14 so that the sensor outputs are not affected by angular adjustment of the cam ring 14. In the disclosed system, the two pump sensors 110, 114 are infrared sensors using a combined trigger or indexing wheel 117 mounted on the rotor 104. Thus, the angle sensor 114 measures the relative rotation of the rotor 104 and cam ring 14 and the timing sensor 110 generates a true Stroke Ref. timing signal having a fixed and known relation to the pumping plunger timing.

Suitable engine sensors 90-96 are employed to transmit current engine data to the ECU 84. The engine sensors 90-96 include (a) a crankshaft timing sensor 90 for generating a TDC Ref. timing signal for each engine cycle, (b) a high resolution, engine angle sensor 91, (c) an engine coolant temperature sensor 92, (d) an altitude or intake manifold pressure sensor 93, (e) a load demand sensor 94 (e.g., operated by an accelerator pedal in a vehicle application), (f) a fuel temperature sensor 95 and (g) an air temperature sensor 96. The crankshaft timing sensor 90 has a trigger wheel 98 with two equiangularly spaced TDC Ref. trigger elements 99 for a four cylinder engine 16. As shown in FIG. 3, the TDC Ref. point is located before the corresponding Stroke Ref. point and the Stroke Ref. point is located approximately at the end of the pump intake stroke and beginning of the pumping stroke.

The engine angle sensor 91 has a trigger wheel 120 (e.g., provided by the flywheel on the engine crankshaft 122) for example with 120 equiangularly spaced trigger elements or gear teeth 124. An engine PLL multiplier or clock 130, like the pump clock 116, is connected in series with the engine angle sensor 91 to provide a high frequency engine clock 130 for measuring engine rotation with greater precision.

In a failsafe operating mode hereafter described, the engine timing sensor 90 is also used to determine Stroke Ref. timing and the high frequency engine clock 130 is also used to measure pump rotation. The reverse is also true. That is, the pump timing sensor 110 is also used to determine the TDC Ref. timing and the high frequency pump clock 116 is also used to measure engine rotation.

The fuel injection timing is synchronized with the engine timing with the TDC Ref. and Stroke Ref. signals. Specifically, the value of the engine reference angle ERA between the TDC Ref. point and Stroke Ref. point is determined and then employed to synchronize fuel injection timing.

The actual fuel injection timing is precisely regulated during each cycle by precisely energizing the solenoid valve 30 at a rotor angle TA which is precisely determined and governed by the ECU 84. Similarly, the actual quantity of fuel injected (i.e., pilot or total quantity, depending on mode of operation) is precisely regulated during each cycle by precisely deenergizing the solenoid valve 30 at a rotor angle QA which is precisely determined and governed by the ECU 84. The quantity angle QA is determined in part from the timing of valve energization VE, valve response angle VRA and Stroke Ref. timing (which together determine fuel injection timing).

Figure 5:
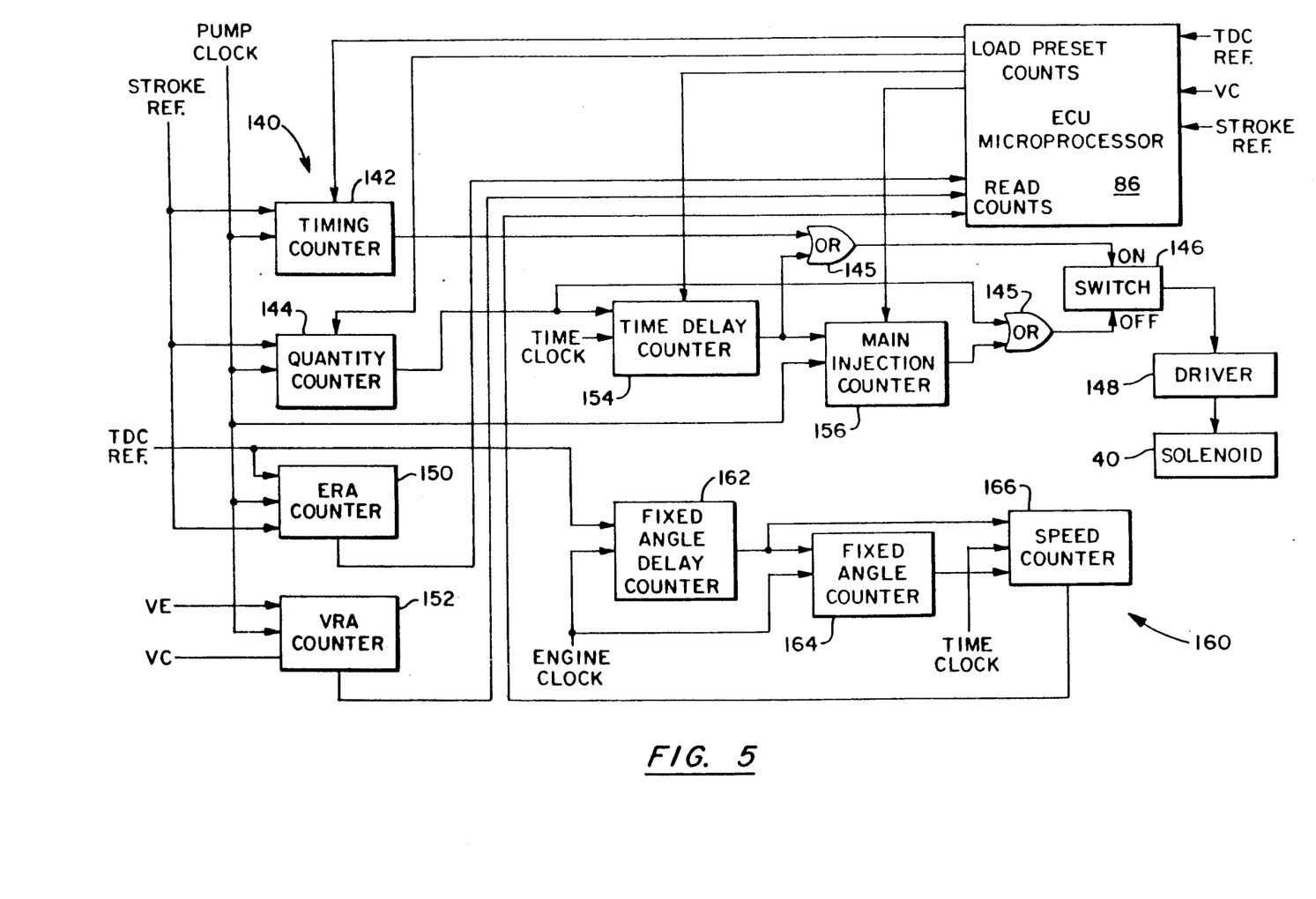
FIG. 5 is a block diagram of a counter network of the processor based control system.

The ECU 84 comprises a network 140 of counters shown in FIG. 5. The network 140 preferably is implemented by hardware (e.g., integrated circuits) incorporated in the ECU 84. In the alternative, the network 140 is implemented by software stored in the ECU memory 82. If implemented by hardware, software execution is faster. If implemented by software, the ECU hardware is less complex but the ECU microprocessor 86 is clocked at a higher frequency to run the more complex software. In either case, the function of the counter network 140 is the same.

The network 140 comprises primary timing and quantity angle counters 142, 144 for measuring and governing the timing angle TA and quantity angle QA. Each primary counter 142, 144 is a subtracting counter. The timing counter 142 measures and governs the angle TA between the Stroke Ref. point and valve energization VE. The quantity counter 144 measures and governs the angle QA between the Stroke Ref. point and valve deenergization VO. During each charge pump/engine cycle, each primary counter 142, 144 is preset at a count established by the ECU. Each primary counter 142, 144 is then stepped or clocked in the subtracting direction by the high frequency pump clock 116.

The outputs of the two primary counters 142, 144 are connected via suitable OR gates 145 and switch 146 to a solenoid driver 148 to provide valve energization (VE) with the timing counter output signal and valve deenergization or valve opening (VO) with the quantity counter output signal.

During each cycle, each primary counter 142, 144 is started by the Stroke Ref. signal (at which point the valve solenoid 40 is energized). Thereafter, the quantity counter 144, when its count reaches zero, generates a signal to open valve 30. Thereafter, the timing counter 142, when its count reaches zero, generates a signal to reclose valve 30 to establish the fuel injection timing for the next fuel injection event.

An ERA angle counter 150 measures the engine reference angle (ERA) offset between the TDC Ref. point and Stroke Ref. point. A VRA angle counter 152 measures the valve response angle VRA. The ERA and VRA counters 150, 152 are addition counters. The ERA counter 150 is started at zero by the TDC Ref. signal, is indexed by the pump clock 116 and is stopped by the Stroke Ref. signal. The ERA count is then stored in the ECU memory 82. Similarly, the VRA counter 152 is started at zero by the valve energization (VE) signal, is indexed by the pump clock 116 and is stopped by the VC feedback signal from the valve solenoid 40. The VRA count is then stored in the ECU memory 82. The current ERA and VRA counts are then used by the ECU 84 in determining the desired settings of the two primary counters 142, 144. Also, the current ERA count is used by the ECU 84 in determining any desired adjustment of the cam ring 14.

Two second stage subtraction counters 154, 156 (i.e., time delay and main injection counters) are connected in series with the quantity counter 144 for use in a pilot injection mode of operation. The pilot injection mode is used only at low engine idle. In that mode, the quantity counter 144 is preset by the ECU 84 to provide a pilot injection of a predetermined small quantity of fuel. The output signal of the quantity counter 144, in addition to deenergizing the valve 30, starts the time delay counter 154 at a preset count established by the ECU. The time delay counter 154 is clocked at a high frequency (e.g., 2 mHz) by a time clock 88 of the ECU microprocessor 86 to provide an extremely short time delay established by its preset count. When the count of the time delay counter 154 reaches zero, it generates a signal to reclose (reenergize) valve 30 and start the main injection counter 156 at a preset count established by the ECU 84. The main injection counter 156 is an angle counter indexed by the pump clock 116. When the count of the main injection counter 156 reaches zero (i.e., after a predetermined angle established by its preset count), it generates a signal to reopen (deenergize) valve 30.

Thus, two stage fuel injection is provided in the pilot injection mode. The quantity counter 144 measures and governs the angle of spill termination (i.e., quantity) of a pilot or first stage injection of fuel; the delay counter 154 establishes a suitable time delay sufficient to limit pilot injection and the main injection counter 156 measures and governs the angle of spill termination (i.e., quantity) of a main or second stage injection of fuel. At speeds above the maximum speed of pilot injection, the two second stage counters 154, 156 are inactive and the quantity counter 144 measures and governs the spill termination and quantity of a single stage fuel injection event.

An adaptive fuel balancing system 160 is provided for multiple cylinder engine applications. The system 160 comprises two fixed angle counters 162, 164 and a speed counter 166 and is used at low engine idle when pilot injection is provided. A first, fixed angle counter 162 is employed to generate an output signal after a fixed delay angle after the TDC Ref. signal. Thus, the counter 162 is started by the TDC Ref. signal at a preset count representing the delay angle, is indexed by the engine clock and generates an output signal when its count reaches zero. The delay angle (e.g., 70°) is established so that a second, fixed angle counter 164 and the speed counter 166 are started by the output signal of the first counter 162 approximately halfway between successive power strokes of the engine 16 for determining any variation in engine RPM due to variations in the power strokes of the engine 16. The second counter 164 is started at a preset count representing a fixed angle of rotation of the engine crankshaft 122 of for example 10°, is indexed by the engine clock 116 and generates an output signal to stop the speed counter 166 when its count reaches zero. During that fixed angle, the speed counter 166 is clocked in the additive direction from zero by the microprocessor time clock 88.

Thus, each speed count of the speed counter 166 represents the instantaneous speed of the engine 16 during a fixed angle located approximately halfway between power strokes. Each speed count is stored in the ECU memory 82. Based on many speed counts stored in memory 82, the ECU 84 modifies, if necessary, the preset count for the main injection counter 156 (when in the pilot injection mode) or primary quantity counter 144 (where pilot injection is not provided) to provide for adaptively balancing the power strokes of the engine 16 to produce smooth engine operation. Specifically, unless a speed change is dictated by other operating data, the preset count for the counter 144 or 156 is modified by one count if there is any difference between the last speed count for the respective power stroke and the average speed count for all power strokes during the last eight revolutions. The injected fuel quantity for each power stroke of the engine 16 is thereby adaptively modified to provide smoother engine operation.

A failsafe switching system 170 (FIG. 6) provides for using one or both engine sensors 90, 91 in place of the corresponding pump sensors 110, 114 if the pump sensors 110, 114 become inoperative or otherwise unreliable. The failsafe switching system also provides for using one or both pump sensors 110, 114 in place of the corresponding engine sensors 90, 91 if the engine sensors become inoperative or otherwise unreliable.

Figure 6:
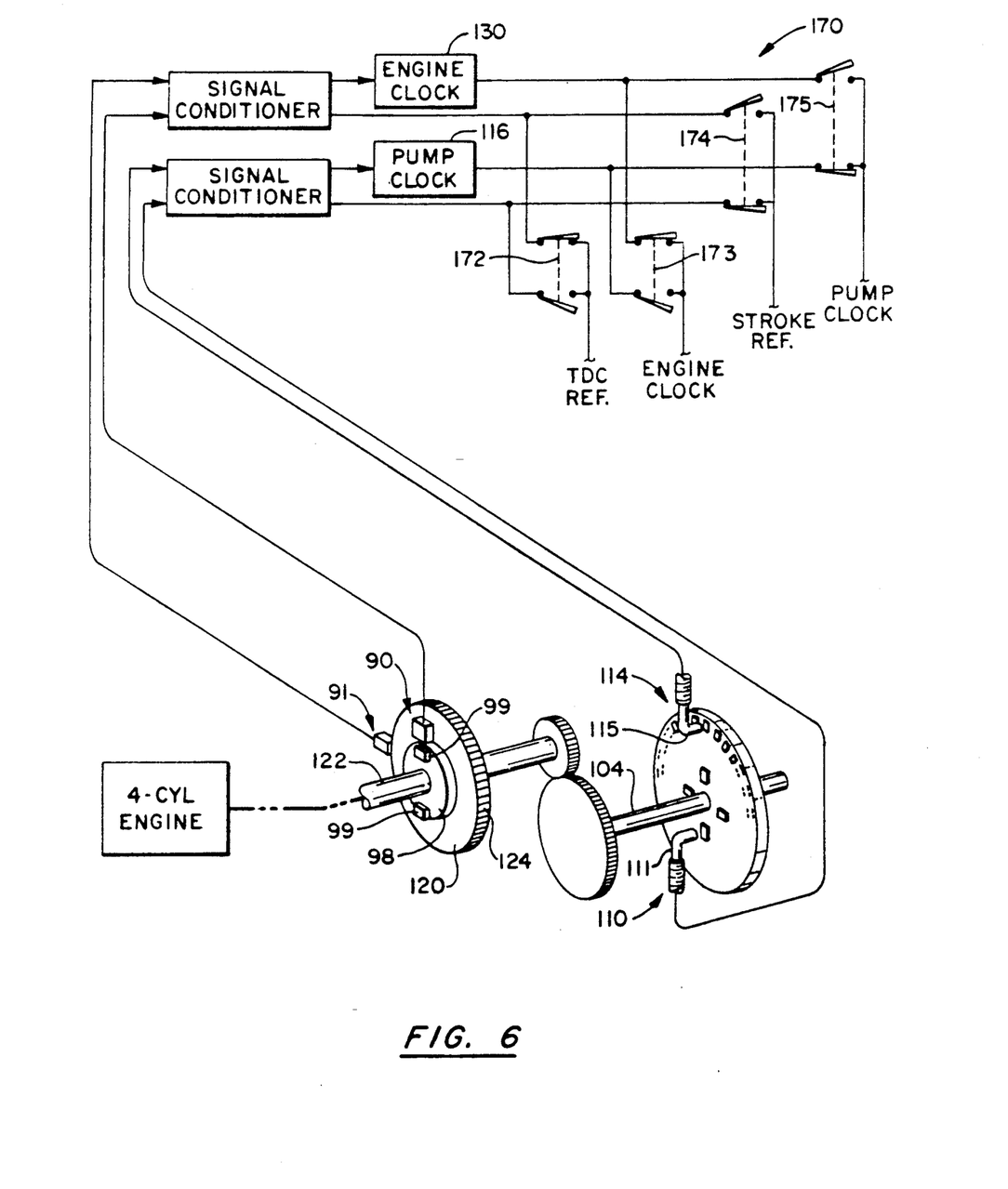
FIG. 6 is a schematic diagram showing a failsafe switching system of the processor based control system.

Thus, if the output of pump clock 116 (or the output of engine clock 130) is unreliable, the switch 175 is operated to switch to the engine clock 130 to measure pump rotation (or the switch 173 is operated to switch to the pump clock 116 to measure engine rotation). If the frequency of the engine clock 130 is different than the pump clock 116, suitable software scaling is used to compensate for the difference. Likewise, if the charge pump timing sensor 110 is unreliable (or the engine timing sensor 90 is unreliable), the switch 174 is operated to switch to the engine timing sensor 90 (or the switch 172 is operated to switch to the pump timing sensor 110). In that event, the timing signal is suitably adjusted by an offset equal to the normal ERA offset for the existing engine RPM. For that purpose, an offset schedule (i.e., ERA offset for each engine RPM) is predetermined and stored in memory 82. Preferably, the ERA offset schedule is established for the system during normal engine operation, using the measured ERA offsets, to avoid any differences between systems. In the failsafe mode of operation, pump control is not as precise but is accurate enough to permit limited engine operation.

The failsafe switching system 170 is implemented either by actual physical switches 172-175 under software control or entirely by software. In either case, the operation is the same and there is an automatic switchover when suitable diagnostic software of the ECU 84 determines that the output of the pump clock 116 and/or pump timing sensor 110 (or the output of the engine clock 130 and/or engine timing sensor 90) is inoperative or otherwise unreliable.

Figure 7:
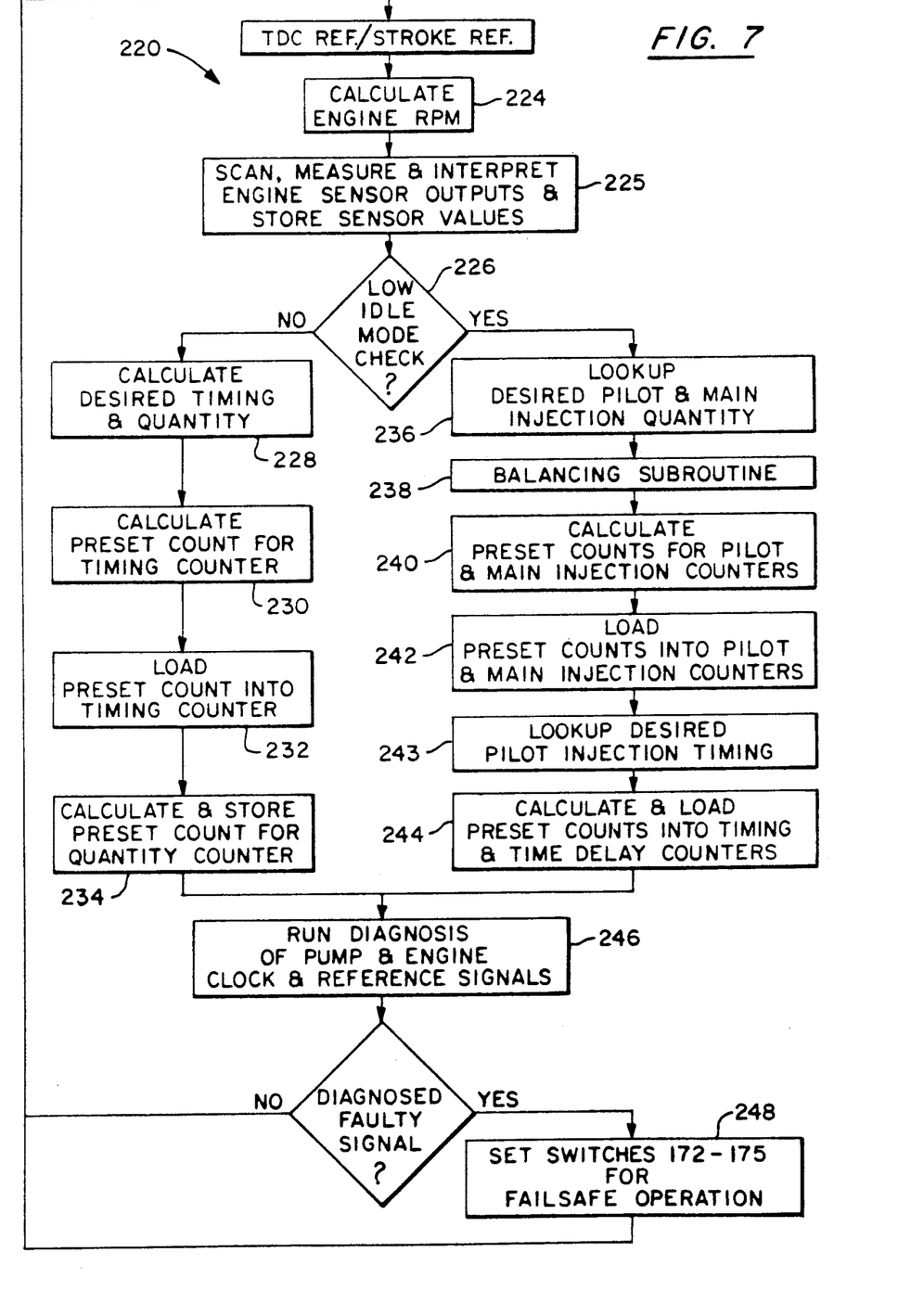
FIGS. 7-11 are flow charts of certain steps performed by the processor based control system.
Figure 8:
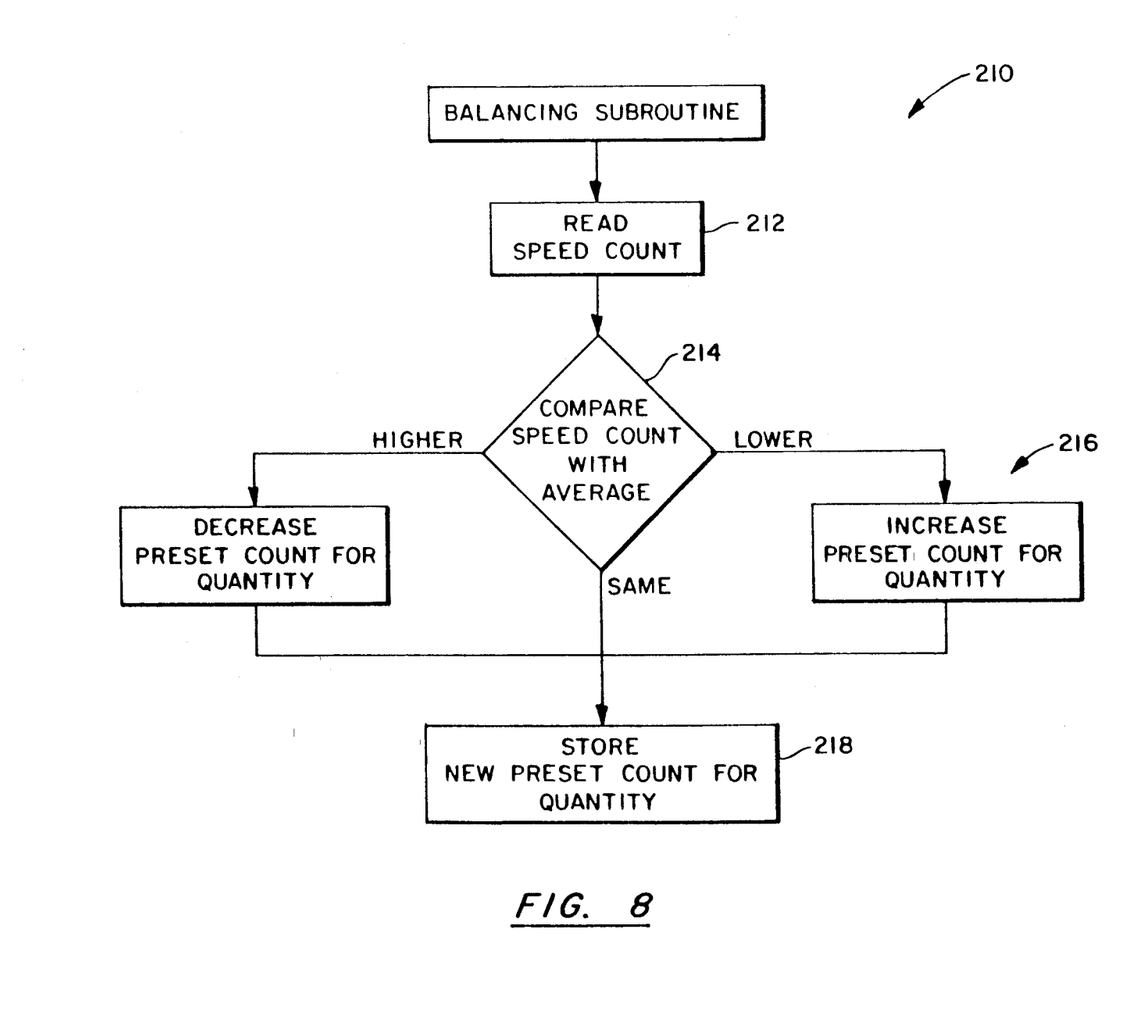
Figures 9, 10:
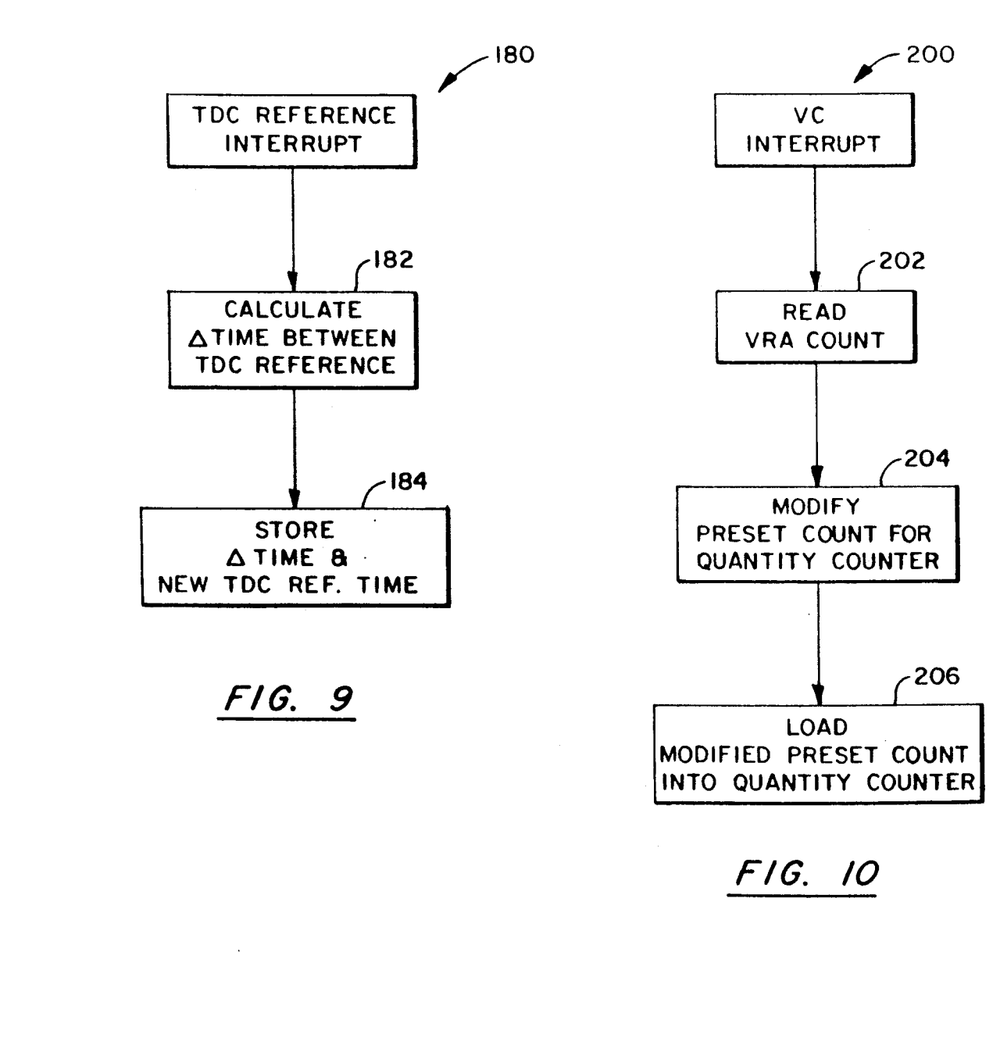
Figure 11:
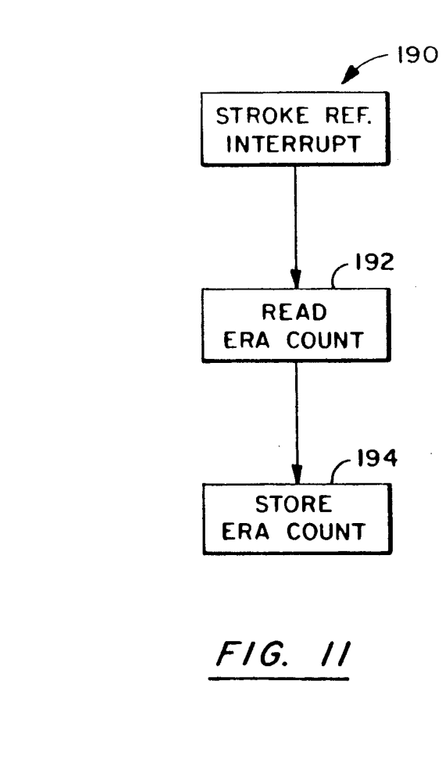

Exemplary flow charts of certain steps performed by the ECU microprocessor 86 are shown in FIGS. 7-11. The flow charts include the steps performed by the ECU microprocessor 86 to regulate the valve closure (VC) and valve opening (VO) timing. FIG. 7 discloses a background loop 220, FIG. 8 illustrates the principal steps of a balancing subroutine 210 provided by one of the steps of the background loop 220 and FIGS. 9-11 show three interrupt initiated routines 180, 190, 200 not included in the background loop.

Referring to FIG. 9, the TDC Ref. signal provides an interrupt signal for initiating a first interrupt routine 180. That routine 180 comprises the step 182 of calculating the time interval between the instant TDC Ref. signal and the preceding TDC Ref. signal and the step 184 of storing that time interval and the new TDC Ref. time in memory. The stored interval is subsequently used as a measure of current engine speed.

Referring to FIG. 10, the valve feedback or VC signal provides an interrupt signal for initiating a second interrupt routine 200. The first step 202 of the routine is to read the VRA count of the VRA counter 152. In succeeding steps 204, 206 (which occur before the Stroke Ref. signal which immediately follows the VC signal), the last calculated preset count for the quantity counter 144 (previously calculated as a step of the background loop and then stored in memory) is modified in accordance with the VRA count and then the modified preset count is loaded into the quantity counter 144. (Above a certain engine speed, the last preset quantity count stored in memory is calculated by the background loop 220 during the immediately preceding cycle, otherwise during the current cycle.)

Referring to FIG. 11, the Stroke Ref. signal provides an interrupt signal for initiating a third interrupt routine 190. This routine comprises the steps 192, 194 of reading the ERA count of the ERA counter and then storing the ERA count in memory 82. The stored ERA count is employed in the succeeding cycle in calculating the desired preset count for each of the primary counters 142, 144.

Referring to FIG. 8, in the first step 212 of the balancing subroutine 210, the current speed count of the speed counter 166 is read. In the next step 214, the current speed count is compared with the average speed count during the last eight revolutions (i.e., last 32 speed counts of a four cylinder engine). In the next step 216 (unless a different preset count is dictated by a change in other current operating data), if the current speed count is higher than average, the last preset count for the respective cycle is decreased one count; if lower than average, the last preset count is increased one count. In the last step 218, the modified preset count (or the current preset count if the speed count is the same as the average) is stored in memory 82 for use in the next corresponding cycle.

The background loop 220 shown in FIG. 7 is normally initiated by the TDC Ref. signal. Depending on engine speed, the background loop 220 may or may not be completed before the following interrupt routine 200 initiated by the VC signal. The TDC Ref. signal is used to initiate the background loop 220 (after interrupt routine 180 is completed) to synchronize the steps performed by the backgroup loop 220 with the interrupt routines 180, 190, 200 shown in FIGS. 9-11. As a safety backup system, if a TDC Ref. signal is not received before a Stroke Ref. signal, the background loop 220 is initiated by the Stroke Ref. signal.

In the first step 224 of the background loop 220, the current engine RPM is determined from the time interval calculated by interrupt routine 180 and stored in memory 82. In the next step 225, the microprocessor 86 scans, measures and interprets the signals received from engine sensors 92-96 (i.e., all engine sensors except angle sensor 91 and TDC Ref. sensor 90) and stores corresponding sensor values in the ECU memory 82. In the next step 226, the current engine RPM and load demand are checked to determine whether a normal or low idle mode of operation is to be implemented. Low idle mode of operation is implemented when the engine speed is below 1200 RPM and the load demand is at its minimum or idle setting. Otherwise, normal mode of operation is implemented.

In the normal mode of operation, the first step 228 is to calculate the desired fuel injection timing and quantity based on the current data stored in memory 82. In the next two steps 230, 232, the preset count for the timing counter 142 is calculated to achieve the desired fuel injection timing (based on the current data, including the latest VRA) and then loaded into the timing counter 142 for the next cycle (after the valve 30 is energized for the current cycle). In the next step 234, the preset count for the quantity counter 144 is calculated to achieve the desired fuel injection quantity and the calculated preset count is then stored in memory 82. (As previously indicated, the last calculated preset quantity count stored in memory is modified and loaded into the quantity counter 144 for the current cycle by interrupt routine 200 initiated by the VC signal.)

In the low idle mode of operation, the first step 236 is to lookup the desired fuel injection quantity for the pilot and main injections. The next step 238 is to run the balancing subroutine 210. In the next two steps 240, 242, the preset pilot and main injection counts for the quantity counter 144 and main injection counter 156 are calculated to achieve the desired pilot and main injection quantities and then loaded into those counters 144, 146. (Thus, in the low idle mode of operation, interrupt routine 200 is not used to modify and then load the preset count for pilot injection into the quantity counter 144.) The next step 243 is to lookup the desired fuel injection timing for pilot injection. In the next step 244, the preset counts for the timing counter 142 and time delay counter 154 are calculated to achieve the desired pilot and main injection timing and then loaded into those counters.

A failsafe routine is run after the normal or low idle steps are completed. In a first step 246 of the failsafe routine, the train of signals from the pump and engine clocks 116, 130 and from the pump and engine sensors 90, 110 are diagnosed for reliability and accuracy. If that diagnosis determines that any of the signals are faulty or unreliable, in a succeeding step 248, one or two switches 172-175 are operated as appropriate to switch inputs and thereby switch the system to a failsafe mode.

Thus, the ECU 84 operates to timely preset and operate each of the counters of the counter network 140. Each preset count is determined in advance in accordance with the current engine and pump data stored in memory. The microprocessor 86 performs various steps to ensure that all of the pertinent operations are performed timely and in the desired sequence. The entire cycle is repeated for each fuel injection cycle.

As will be apparent to persons skilled in the art, various modifications, adaptations and variations of the foregoing specific disclosure can be made without departing from the teachings of the present invention.

What is claimed is:

1. In a fuel injection system, for an internal combustion engine, having a charge pump with a drive rotor, reciprocating pumping means with a pumping cycle with an intake stroke to receive an intake charge of fuel and a pumping stroke to deliver fuel for fuel injection, and cam means to reciprocate the pumping means, the cam means and pumping means being relatively rotatable by the drive rotor to provide periodic pumping cycles of the pumping means at a rate proportional to said relative rotation; electrical valve means having open and closed positions and which, in the open position thereof, is operable to supply fuel tot he charge pump during its intake stroke and to spill fuel from the charge pump during its pumping stroke, the electrical valve means being selectively electrically operable for opening and closing the valve means; and a processor based control system actively governing the electrical operation of the valve means to regulate the fuel injection timing and quantity in accordance with certain engine and pump data; the improvement wherein the processor based control system comprises pump rotation measuring means for generating a pump clocking pulse for each predetermined increment, less than one degree, of said relative rotation, reference means for establishing a predetermined reference point of each pumping cycle, and processor based valve governing means for counting fist and second preset counts of said pump clocking pulses for each pumping cycle, each starting at one of said reference points, the valve governing means closing and opening the valve means for injecting fuel during the pumping stroke by electrically operating the valve means to close the valve means when said first preset count is reached and thereafter electrically operating the valve means to open the valve means during the pumping stroke when said second preset count is reached, the valve governing means establishing the fuel injection timing and quantity for each pumping cycle by establishing said first and second preset counts for the pumping cycle before their respective starting points.

2. A fuel injection system according to claim 1 wherein the pump rotation measuring means comprises a pump angle sensor for generating a sensor pulse for each predetermined increment of said relative rotation and a pump clock for generating said pump clocking pulses at a variable high frequency proportional to the incremental frequency of said sensor pulses.

3. A fuel injection system according to claim 2 wherein the pump clock generates said pump clocking pulses at a frequency which is a multiple of said incremental frequency of said sensor pulses.

4. A fuel injection system according to claim 1 wherein said predetermined increment is less than one-tenth of a degree of said relative rotation.

5. A fuel injection system according to claim 1 wherein said first, preset count is established by the valve governing means to electrically close the valve means during the intake stroke of the pumping means to regulate the intake charge quantity of fuel supplied to the charge pump during the intake stroke and thereby regulate the fuel injection timing, and wherein said second, preset count is established by the valve governing means to electrically open the valve means during the pumping stroke to regulate the injected charge quantity by regulating the spill termination of said delivery of fuel.

6. A fuel injection system according to claim 5 wherein said first, preset count is established for each pumping cycle by the valve governing means by at least partly determining said first, preset count while the valve means is closed during the immediately preceding pumping cycle.

7. A fuel injection system according to claim 5 wherein, at least above a certain engine speed, said second, preset count is established for each pumping cycle by the valve governing means by at least partly determining said second, preset count during the immediately preceding pumping cycle after the valve means is closed.

8. A fuel injection system according to claim 5, wherein the valve governing means is operable for counting a valve response angle count of said pump clocking pulses during the interval between the electrical operation of the valve means to close the valve means and the complete closure of the valve means, and wherein said second, preset count is established by the valve governing means for each pumping cycle based in part on the valve response angle count of the same pumping cycle.

9. A fuel injection system according to claim 1 wherein the reference means comprises a stroke timing sensor for generating a stroke reference signal at said predetermined reference point of each pumping cycle.

10. A fuel injection system according to claim 9 for a multiple cylinder, reciprocating engine having a rotatable crankshaft, wherein the processor based control system comprises an engine timing sensor for generating an engine reference signal at a predetermined reference point of each engine cycle, and wherein the valve governing means diagnoses the reliability of said pump reference signals and is operable to automatically substitute said engine reference signals, adjusted by an angle offset between the engine and stroke reference signals according to a preestablished schedule of offset values, for said pump reference signals when said pump reference signals are diagnosed to be unreliable.

11. A fuel injection system according to claim 9 for a multiple cylinder, reciprocating engine having a rotatable crankshaft, wherein the processor based control system comprises an engine timing sensor for generating an engine reference signal at a predetermined reference point of each engine cycle, and wherein the valve governing means diagnoses the reliability of said engine reference signals and is operable to automatically substitute said pump reference signals, adjusted by an angle offset between the engine and stroke reference signals according to a preestablished schedule of offset values, for said engine reference signals when said engine reference signals are diagnosed to be unreliable.

12. A fuel injection system according to claim 1 wherein the reciprocating pumping means comprises a plurality of radially extending bores in the drive rotor and a reciprocating pumping plunger within each bore, wherein said cam means is an annular cam surrounding the drive rotor for reciprocating the pumping plungers as the drive rotor rotates, and wherein the processor based control system adjusts the angular position of the annular cam to adjust the pumping cycle timing.

13. A fuel injection system according to claim 1 wherein the valve governing means is operable for counting a valve response angle count of said pump clocking pulses during the interval between the electrical operation of the valve means to close the valve means and the complete closure of the valve means, and wherein said first and second preset counts are established for each pumping cycle by the valve governing means in accordance with the valve response angle count of the preceding pumping cycle and current pumping cycle respectively.

14. A fuel injection system according to claim 1 wherein the valve governing means comprises a fixed frequency clock for generating time clocking pulses at a fixed frequency, and wherein the valve governing means is operable, in a two stage mode of operation, for counting a third, delay count of said time clocking pulses, starting when said second preset count is reached and for counting a fourth, preset count of said pump clocking pulses starting when said third, delay count is reached, the valve governing means being operable to provide a second stage injection of fuel by electrically operating the valve means to close the valve means when said third, delay count is reached and electrically operating the valve means to open the valve means when said fourth, preset count is reached, the valve governing means establishing said third, delay count and said fourth, preset count to regulate the second stage injection of fuel.

15. A fuel injection system according to claim 14, for a multiple cylinder, reciprocating engine having a rotatable crankshaft, wherein the processor based control system comprises engine rotation measuring means for generating an engine clocking pulse for each predetermined increment, less than one degree, of rotation of the engine crankshaft, wherein the valve governing means is operable, in a balancing mode of operation, for counting a fifth, fixed count of said engine clocking pulses starting at a predetermined reference point of each engine cycle, counting a sixth, fixed count of said engine clocking pulses starting when said fifth, fixed count is reached and counting a speed count of said time clocking pulses during the sixth, fixed count, the fifth and sixth, fixed counts being established to count said speed count between power strokes of the engine, and wherein the valve governing means is operable to modify each said fourth, preset count to adaptively balance the power strokes of the engine in accordance with corresponding speed counts.

16. A fuel injection system according to claim 1, for a multiple cylinder, reciprocating engine having a rotatable crankshaft, wherein the processor based control system comprises engine rotation measuring means for generating an engine clocking pulse for each predetermined increment, less than one degree, of rotation of the engine crankshaft, wherein the valve governing means is operable, in a balancing mode of operation, for counting a third, fixed count of said engine clocking pulses starting at a predetermined reference point of each engine cycle, counting a fourth, fixed count of said engine clocking pulses starting when said third, fixed count is reached and counting a speed count of said time clocking pulses during the fifth, fixed count, the third and fourth, fixed counts being established to count said speed count between power strokes of the engine, and wherein the valve governing means is operable to modify each said second, preset count to adaptively balance the power strokes of the engine in accordance with corresponding speed counts.

17. A fuel injection system according to claim 1 wherein the valve governing means is operable for counting an engine reference angle count of said pump clocking pulses during the interval between a predetermined reference point of each engine cycle and said predetermined reference point of each pumping cycle, and wherein said first and second preset counts are established by the valve governing means in accordance with the engine reference angle count.

18. A fuel injection system according to claim 1 for a multiple cylinder, reciprocating engine having a rotatable crankshaft, wherein the processor based control system comprises engine rotation measuring means for generating an engine clocking pulse for each predetermined increment, less than one degree, of rotation of the engine crankshaft, and wherein the valve governing means diagnoses the reliability of said pump clocking pulses and is operable to automatically substitute said engine clocking pulses for said pump clocking pulses when said pump clocking pulses are diagnosed to be unreliable.

19. A fuel injection system according to claim 1 for a multiple cylinder, reciprocating engine having a rotatable crankshaft, wherein the processor based control system comprises engine rotation measuring means for generating an engine clocking pulse for each predetermined increment, less than one degree, of rotation of the engine crankshaft, and wherein the valve governing means diagnoses the reliability of said engine clocking pulses and is operable to automatically substitute said pump clocking pulses for said engine clocking pulses when said engine clocking pulses are diagnosed to be unreliable.

20. In a fuel injection system, for an internal combustion engine, having a charge pump with a drive rotor, reciprocating pumping means with a pumping cycle with an intake stroke to receive an intake charge of fuel and a pumping stroke to deliver fuel for fuel injection, and cam means to reciprocate the pumping means, the cam means and pumping means being relatively rotatable by the drive rotor to provide periodic pumping cycles of the pumping means at a rate proportional to said relative rotation; electrical valve means having open and closed positions and which, in the open position thereof, is operable to supply fuel to the charge pump during its intake stroke and to spill fuel from the charge pump during its pumping stroke, the electrical valve means being selectively electrically operable for opening and closing the valve means; and a processor based control system actively governing the electrical operation of the valve means to regulate the fuel injection timing and quantity in accordance with certain engine and pump data; the improvement wherein the processor based control system comprises pump rotation measuring means for generating a pump clocking pulse for each predetermined increment, less than one degree, of said relative rotation, reference means for establishing a predetermined reference point of each pumping cycle, and processor based valve governing means for counting a plurality of different preset counts of said pump clocking pulses for each pumping cycle, each starting at one of said reference points, the valve governing means closing and opening the valve means for injecting fuel during the pumping stroke by electrically operating the valve means to close the valve means when certain of said plurality of preset counts is reached and electrically operating the valve means to open the valve means during the pumping stroke when certain other of said plurality of preset counts is reached, the valve governing means establishing said fuel injection timing and quantity for each pumping cycle by establishing said preset counts for the pumping cycle before their respective starting points.

21. A fuel injection system according to claim 18, for a multiple cylinder, reciprocating engine having a rotatable crankshaft, wherein the valve governing means comprises a fixed frequency clock for generating time clocking pulses at a fixed frequency, wherein the processor based control system comprises engine rotation measuring means for generating an engine clocking pulse for each predetermined increment, less than one degree, of rotation of the engine crankshaft, wherein the valve governing means is operable, in a balancing mode of operation, for counting a first, fixed count of said engine clocking pulses starting at a predetermined reference point of each engine cycle, counting a second, fixed count of said engine clocking pulses starting when said first, fixed count is reached and counting a speed count of said time clocking pulses during the second, fixed count; the first and second, fixed counts being established to count said speed count between power strokes of the engine, and wherein the valve governing means is operable to modify certain of said established preset counts to adaptively balance the power strokes of the engine in accordance with corresponding speed counts.

22. In a fuel injection system, for an internal combustion engine, having a charge pump with a drive rotor, reciprocating pumping means with a pumping cycle with an intake stroke to receive an intake charge of fuel and a pumping stroke to deliver fuel for fuel injection, cam means to reciprocate the pumping means, the cam means and pumping means being relatively rotatable by the drive rotor to provide periodic pumping cycles of the pumping means at a rate proportional to said relative rotation and timing adjustment means operable for adjusting the pumping cycle timing relative to the drive rotor; electrical valve means having open and closed positions and which, in the open position thereof, is operable to supply fuel to the charge pump during its intake stroke and to spill fuel from the charge pump during its pumping stroke, the electrical valve means being selectively electrically operable for opening and closing the valve means; and a processor based control system actively governing the electrical operation of the valve means to regulate the fuel injection quantity in accordance with certain engine and pump data; the improvement wherein the processor based control system operates the timing adjustment means for adjusting said pumping cycle timing and wherein the processor based control system comprises pump rotation measuring means for generating a pump clocking pulse for each predetermined increment, less than one degree, of said relative rotation, reference means for establishing a predetermined reference point of each pumping cycle, and processor based valve governing means for mounting first and second preset counts of said pump clocking pulses for each pumping cycle, each starting at one of said reference points, the valve governing means closing and opening the valve means for injecting fuel during the pumping stroke by electrically operating the valve means to close the valve means when said first preset count is reached and thereafter electrically operating the valve means to open the valve means during the pumping stroke when said second preset count is reached, the valve governing means establishing the fuel injection timing and quantity for each pumping cycle by establishing said first and second preset counts for the pumping cycle before their respective starting points.

* * * * *

UNITED STATES PATENT AND TRADEMARK OFFICE
CERTIFICATE OF CORRECTION

PATENT NO. : 5,103,792
DATED : April 14, 1992
INVENTOR(S) : Robert R. Winkler et al It is certified that error appears in the above-identified patent and that said Letters Patent is hereby corrected as shown below:

Column 2, line 5, substitute -- be -- for "b".

Col. 11, claim 1, line 12, substitute --to the-- for "tot he".

Col. 16, claim 22, line 30, substitute --counting-- for "mounting".

Signed and Sealed this

Third Day of August, 1993

Attest:

MICHAEL K. KIRK

Attesting Officer     Acting Commissioner of Patents and Trademarks